(12) United States Patent
Goad et al.

(10) Patent No.: US 8,313,621 B2
(45) Date of Patent: Nov. 20, 2012

(54) VALVE METAL ANODE PELLETS FOR CAPACITORS FORMED USING FORCED CONVECTION OF LIQUID ELECTROLYTE DURING ANODIZATION

(75) Inventors: David Goad, Buffalo, NY (US); Neal Nesselbeck, Lockport, NY (US); Jason Hahl, Cheektowaga, NY (US)

(73) Assignee: Greatbatch Ltd., Clarence, NY (US)

( * ) Notice: Subject to any disclaimer, the term of this patent is extended or adjusted under 35 U.S.C. 154(b) by 201 days.

(21) Appl. No.: 13/015,679

(22) Filed: Jan. 28, 2011

(65) Prior Publication Data

US 2011/0122543 A1 May 26, 2011

Related U.S. Application Data

(62) Division of application No. 11/565,766, filed on Dec. 1, 2006, now Pat. No. 7,879,217.

(60) Provisional application No. 60/742,126, filed on Dec. 2, 2005.

(51) Int. Cl.
  *C25D 17/00* (2006.01)
  *C25D 11/02* (2006.01)
(52) U.S. Cl. ............ 204/275.1; 205/148; 205/322
(58) Field of Classification Search ............ 204/275.1
  See application file for complete search history.

(56) References Cited

U.S. PATENT DOCUMENTS

| | | | |
|---|---|---|---|
| 2,998,372 A | 8/1961 | Wagner | |
| 3,492,544 A | 1/1970 | Falanga | |
| 3,494,840 A | 2/1970 | Dedrick et al. | |
| 3,640,854 A * | 2/1972 | Klein | 205/128 |
| 4,225,399 A * | 9/1980 | Tomita | 205/148 |
| 4,331,525 A | 5/1982 | Huba et al. | |
| 4,859,288 A | 8/1989 | Fumeaux et al. | |
| 5,032,244 A | 7/1991 | Bommier et al. | |
| 5,679,233 A | 10/1997 | Van Anglen et al. | |
| 6,231,993 B1 | 5/2001 | Stephenson et al. | |
| 6,235,181 B1 | 5/2001 | Kinard et al. | |
| 6,802,951 B2 | 10/2004 | Hossick-Schott | |
| 2004/0134874 A1 | 7/2004 | Hossick-Schott et al. | |
| 2004/0243183 A1 | 12/2004 | Norton et al. | |
| 2005/0190530 A1 | 9/2005 | Muffoletto et al. | |
| 2006/0091020 A1 | 5/2006 | Hossick-Schott et al. | |

FOREIGN PATENT DOCUMENTS

WO   WO 03029527 A1 * 4/2003

OTHER PUBLICATIONS

European Search Report dated Mar. 4, 2010, Application No. 06256188.1.

* cited by examiner

*Primary Examiner* — Jonathan Johnson
*Assistant Examiner* — Bryan D. Ripa
(74) *Attorney, Agent, or Firm* — Michael F. Scalise

(57) ABSTRACT

A method and apparatus for anodizing a porous valve metal pellet in a flowing liquid electrolyte is described. The apparatus comprises an insulative container comprised of a lower region, a central region including a cavity for holding the pellet, an upper region, and a continuous passageway extending through the lower, central, and upper regions. Lower and upper screens serving as lower and upper electrodes are disposed in the passageway in the lower and upper container regions, respectively. During anodizing, the electrolyte flows through the lower container region including the lower screen, the porous pellet and then the upper container region including the upper screen. The lower and upper screens are at an opposite electrical polarity as the pellet so that a dielectric oxide is formed on the exposed valve metal including interior portions of the pellet that are exposed to the flowing electrolyte.

24 Claims, 6 Drawing Sheets

VALVE METAL ANODE PELLETS FOR CAPACITORS FORMED USING FORCED CONVECTION OF LIQUID ELECTROLYTE DURING ANODIZATION

CROSS-REFERENCE TO RELATED APPLICATIONS

This application is a divisional of U.S. patent application Ser. No. 11/565,766, filed Dec. 1, 2006, now U.S. Pat. No. 7,879,217, which claims priority from U.S. Provisional Application Ser. No. 60/742,126, filed Dec. 2, 2005.

BACKGROUND OF THE INVENTION

1. Field of the Invention

The present invention relates generally to anodization of a pellet of a valve metal powder for use as an anode in an electrolytic or an electrochemical/electrolytic hybrid capacitor. Anodization of the valve metal pellet or body is performed in an electrolyte that is flowed through the valve metal pellet to produce a stable oxide layer with a high dielectric constant. A preferred valve metal is tantalum.

2. Description of Related Art

In general, electrolytic capacitors comprise anodes and cathodes that are physically segregated from each other by a porous separator material impregnated with an ionically conductive working electrolyte. The working electrolyte is typically composed of water, solvent(s), and salt(s) of weak inorganic and/or organic acids. The anodes are of a valve metal having its exposed pore surface coated with a film of the corresponding oxide serving as a dielectric. Valve metals include, but are not limited to, aluminum, tantalum, niobium, titanium, zirconium, hafnium, and alloys thereof. The valve metal can be in any conventional form including etched foil, sintered powders, or other porous structures. Anodizing the valve metals in an appropriate anodizing electrolyte forms a dielectric oxide film thereon. The film thickness increases with the anodizing voltage. The desired oxide film thickness is determined by the capacitor working voltage, operation temperature and other performance requirements.

It is believed that locally excessive temperatures and insufficient material transport in porous valve metal bodies during anodizing (especially for anodization of high voltage, relatively large, pressed and sintered tantalum powder pellets) causes breakdown or poor anode electrical properties. There have been numerous attempts to solve these problems by improving the heat and electrolyte transport between the pellets and the bulk electrolytes. Some of the prior art methods include: controlling the anodizing current density; mechanical, sonic, or ultrasonic agitation of the electrolyte; anodizing by combining control of voltage/current and controlled rest steps (U.S. Pat. No. 6,231,993 to Stephenson et al.); and controlled pulses of the voltage/current (U.S. Pat. No. 6,802,951 to Hossick-Schott). These methods require sophisticated electronics for current/voltage/power control and frequent on/off switches that increase anodizing time. Additionally, it is believed that the eruptive increase in current/voltage in the case of pulsed anodizing may cause early breakdown and poor oxide quality.

U.S. Patent Application Pub. No. 2006/0196774 to Liu et al. discloses a method of anodizing valve metals by self-adjusted current and power. U.S. Patent Application Pub. No. 2006/0191796 to Muffoletto et al, discloses a method of anodizing valve metals by controlled power. The disclosed methods provide improved anodization of valve metals by application of electrical power to the valve metal at specific levels and in specifically timed on-off sequences. These publications are assigned to the assignee of the present invention and incorporated herein by reference Thus, it is known that the conditions for anodizing must be carefully controlled in order to provide a suitable oxide layer. In particular, the current applied during formation is generally kept low to avoid electrical breakdown. Additionally, the current may be turned off or reduced for periods of minutes to several hours during formation, as described in the above patent applications of Liu et al. and Muffoletto et al. The low current and the "off" periods make the formation process very slow; thirty hours or more may be required to form an anode pellet for a capacitor. Although there is no general agreement on the precise mechanism by which formation current leads to electrical breakdown, it is thought by some that the current must be kept low in order to avoid overheating the pellet. Others believe that the formation process is limited by the relatively slow diffusion of electrolyte components or products of the electrochemical oxidation.

In any event, the speed of the formation process is limited by the ability of conventional means to remove heat and/or "used" electrolyte from the interior of the pellet. "Conventional" in this sense means relying on stirring by means of pumps or stirrers to provide sufficient convective flow of electrolyte around an anode pellet immersed in an electrolyte bath. To the extent that there is any increased convective heat and/or mass transfer in the electrolyte at the anode pellet, the enhancement likely only occurs at the outer (visible) surface of the pellet, and not at the internal pore surfaces.

Consequently, it has been found that there are greater difficulties in preparing capacitor anode pellets for high voltage use, and these difficulties are increased as the desired thickness of the oxide layer on the pellet surface increases. Among these difficulties are electrical breakdown which occurs with increasing likelihood at higher formation voltages, and so-called "gray-out". "Gray-out" refers to the appearance of gray or whitish oxide patches on the pellet due to the formation of crystalline oxide, which is more "electrically leaky", i.e., having localized areas of lower electrical resistance, than the desired amorphous oxide. This may occur when formation is carried out using a low current density with the intention of reducing electrical breakdowns.

Therefore, there remains a need for an apparatus and a method for manufacturing a valve metal anode such as of the kind typically used in an electrolytic capacitor. Particularly, it is desirable to provide valve metal anodes with dielectric coatings having improved oxide quality and higher breakdown voltages. In that light, the present invention teaches an apparatus and a anodization method that reduces process time and provides a better quality dielectric oxide. With the present invention, the current density used during formation of the oxide layer may be increased and the time required for oxide layer formation decreased. These attributes substantially improve the economics of manufacturing valve metal anodes.

Therefore, although this invention is, in principle, applicable to all valve metal anodes, it is particularly useful for anodizing a high voltage sintered tantalum pellet for use in an electrolytic capacitor.

SUMMARY OF THE INVENTION

An apparatus for anodizing a valve metal body in a flowing liquid electrolyte is provided. The apparatus comprises an insulative container comprised of a lower region, a central region including a cavity for holding the valve metal body, and an upper region. A continuous flow passageway extends through the lower, central and upper regions. A lower cathode screen is disposed in the passageway in the lower region and an upper cathode screen is disposed in the upper container region. When a liquid electrolyte is delivered into the continuous passageway at the lower region, the electrolyte flows through the lower cathode screen, the cavity of the central region, and then through the upper cathode screen.

The valve metal body is useful as an anode in an electrolytic capacitor and may be in the form of a relatively thin foil or a pellet. Preferably, the body is a porous pellet formed by sintering a pressed powder of the valve metal. The pellet may be a cylindrical disc, or of an irregular shape, such as a crescent shape, as specifically needed for use in the electrolytic capacitor. Accordingly, the cavity for holding the valve metal body is dimensioned to be contiguous with the perimeter of the porous pellet.

The porous pellet may further comprise a lead wire extending therefrom. When the pellet is in the cavity, the lead wire extends to the container exterior. In a like manner, the lower and upper cathode screens comprise leads extending to the container exterior. The pellet, lead and the cathode sheet leads connect to a power supply. When electrical power is applied to the cathode sheet leads and the pellet lead while a liquid electrolyte flows through the container, the pellet is anodized with a dielectric oxide formed thereupon. The porous pellet and the first and second cathode screens may be made of a valve metal selected from the group consisting of tantalum, niobium, aluminum, titanium, and alloys thereof. In operation, the apparatus functions as an electrolytic cell for anodizing the porous valve metal pellet.

The container may be provided with different configurations for holding the cathode screens and the valve metal body in the flowing electrolyte stream. In one embodiment, the lower container region comprises a lower cathode retainer, the upper container region comprises an upper cathode retainer, and the central container region comprises a lower housing portion that is contiguous with an upper housing portion. The cavity for holding the valve metal body is formed between the lower and upper housing portions. The lower cathode screen is disposed between the lower cathode retainer and the lower housing portion. The upper cathode screen is disposed between the upper cathode retainer and the upper housing portion. The retainers and housing portions are made of an insulating material that prevents an electrical short circuit between the cathode screens and the valve metal body when a voltage is applied to them. One preferred insulative material is polypropylene.

In another embodiment, the lower container region comprises a lower retainer housing joined to a lower retainer plate, the upper container region comprises an upper retainer housing joined to an upper retainer plate, and the central container region comprises a lower housing portion that is contiguous with an upper housing portion. The cavity for holding the valve metal body is formed between the lower and upper housing portions. In this configuration, the lower cathode screen is disposed between the lower retainer housing and the lower retainer plate, and the upper cathode screen is disposed between the upper retainer housing and the upper retainer plate. The apparatus may further include a first filter mesh disposed in the continuous passageway between the lower cathode screen and the valve metal body cavity and a second filter mesh disposed in the passageway between the upper cathode screen and the cavity.

In another embodiment, only a single cathode screen is provided in the apparatus. In this configuration, the apparatus comprises a container comprised of a lower region, a central region including a cavity for holding the valve metal body, an upper region, and a continuous passageway extending through the lower, central and upper regions including the central region cavity. A cathode screen is disposed in the continuous container passageway. When a liquid electrolyte is delivered into the continuous passageway at the lower region, the electrolyte flows from the lower region, through the central region cavity and the cathode screen, and through the upper region. The cathode screen may be located in either the lower region or the upper region. However, superior oxide films are formed on the valve metal body when cathode screens are located both upstream and downstream of the body during anodization.

Also according to the present invention, a method for anodizing a valve metal body is described. The method comprises securing the valve metal body in a cavity within a container comprised of a lower region, a central region including the valve metal body cavity, and an upper region. A continuous passageway extends through the regions. At least one cathode screen is disposed in the continuous container passageway. A liquid electrolyte is flowed through the passageway from the lower region including the perforated cathode screen, through the cavity and over and through the valve metal body. The cathode screen and the valve metal body are connected to opposite polarity terminals of an electrical power supply, thereby causing an electrical current to flow through the electrolyte between the cathode screen and the valve metal body. This forms an oxide layer on the exposed surfaces of the valve metal body.

Also according to the present invention, an anode for a capacitor is provided comprising tantalum powder in the form of a porous body. The tantalum is characterized as having been anodized in a liquid electrolyte flowing through the body to form an oxide layer on the exposed surfaces thereof. Additionally, a capacitor is provided comprising a porous tantalum body characterized as having been anodized in a flowing liquid electrolyte to form an oxide layer on the exposed surfaces thereof, a cathode, a separator segregating the anode from the cathode, and a working electrolyte.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which.

Figure 1:
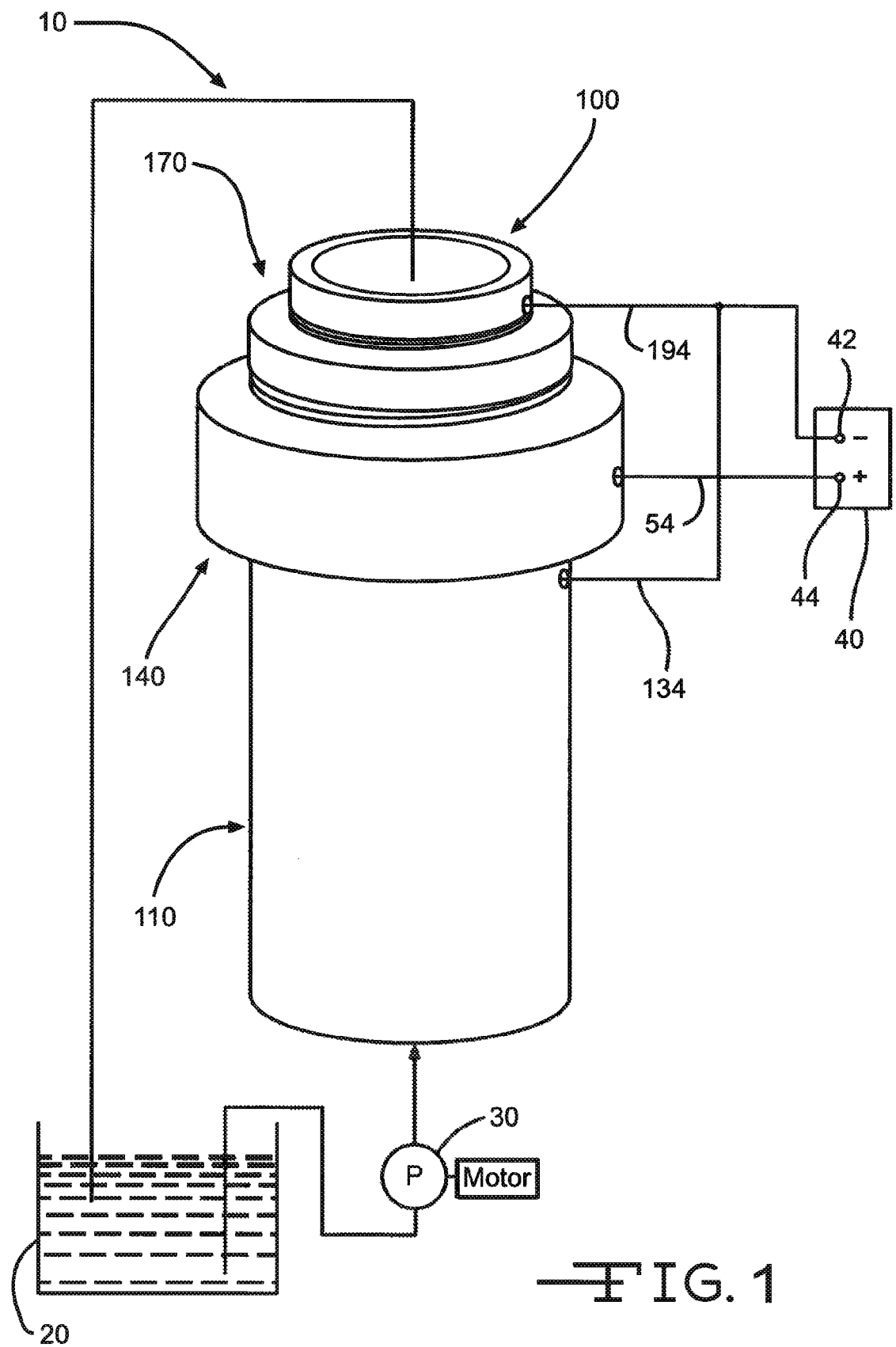
FIG. 1 is a schematic illustration of an apparatus for anodizing a valve metal pellet immersed in a flowing stream of electrolyte.

The present invention will be described in connection with preferred embodiments, however, it will be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

Porous valve metal pellets are preferred in electrolytic capacitors used in implantable medical devices such as cardioverter defibrillators. The anodizing apparatus and method of the present invention are particularly useful for anodizing large and high voltage sintered powder anodes such as those used in tantalum electrolytic capacitors powering implantable medical devices. In that respect, the apparatus and method of the present invention are directed to forming valve metal bodies into anodes by providing the bodies with dielectric coatings having improved oxide quality and high breakdown voltages. The valve metals to be made into anodes can be in any conventional form, such as etched foil, sintered powders, or other porous structures. The following description will be provided with reference to a particular valve metal form made by sintering a pressed powder pellet. It is to be understood, however, that the apparatus and methods of the present invention are applicable to other valve metal objects such as foils, sheets, and solid pellets in a variety of shapes and sizes. Any of these may be anodized, provided that the present apparatus is configured to provide a flow of electrolyte over and through the body during anodization, as will be described herein.

In the anodization apparatus and method of the present invention, the relative motion of the electrolyte with respect to the anode pellet is increased over that of conventional anodization methods in which the anode pellet is immersed in a quiescent or stirred electrolyte bath. This is accomplished by taking advantage of the porous structure of the anode pellet. Liquid electrolyte is forced through the pores of the pellet under pressure. This forced internal convection provides increased heat and mass transfer in the electrolyte within the interior of the pellet.

It is noted that in the following description, the apparatus is described with reference to a "lower" region and an "upper" region, with upper and lower being in the conventional sense with respect to gravity. The container of the apparatus is shown and described in this manner with a preferred orientation with respect to gravity, and the preferred direction of electrolyte flow through the container being upward. This is because in some circumstances, a gas may be evolved at the cathode(s) and an upward electrolyte flow ensures continuous purging of any evolved gas. However, it is to be understood that the present apparatus may be operated with orientations other than shown such as a horizontal orientation while still achieving satisfactory results. Accordingly, the terms "lower" and "upper" are not intended to be limiting with respect to orientation of the apparatus, but rather referring to the relative positions of the various components with respect to each other.

Additionally, the electrolyte used in the anodization apparatus and methods described herein are generally referred to as a "liquid" electrolyte. This means that the electrolyte flowed through the apparatus when the anodization process begins is a single phase homogeneous liquid. However, in the electrochemical reaction at the cathode(s), hydrogen gas may be evolved and, consequently, the flowing electrolyte within the container may become a two-phase fluid including bubbles of evolved gas. Therefore, as used herein, the term "liquid electrolyte" includes, but is not limited to, a homogeneous single phase liquid electrolyte, a single phase liquid electrolyte containing dissolved gases or a concentration gradient of ionic species, and a liquid phase electrolyte with gas bubbles distributed therein.

Figure 2:
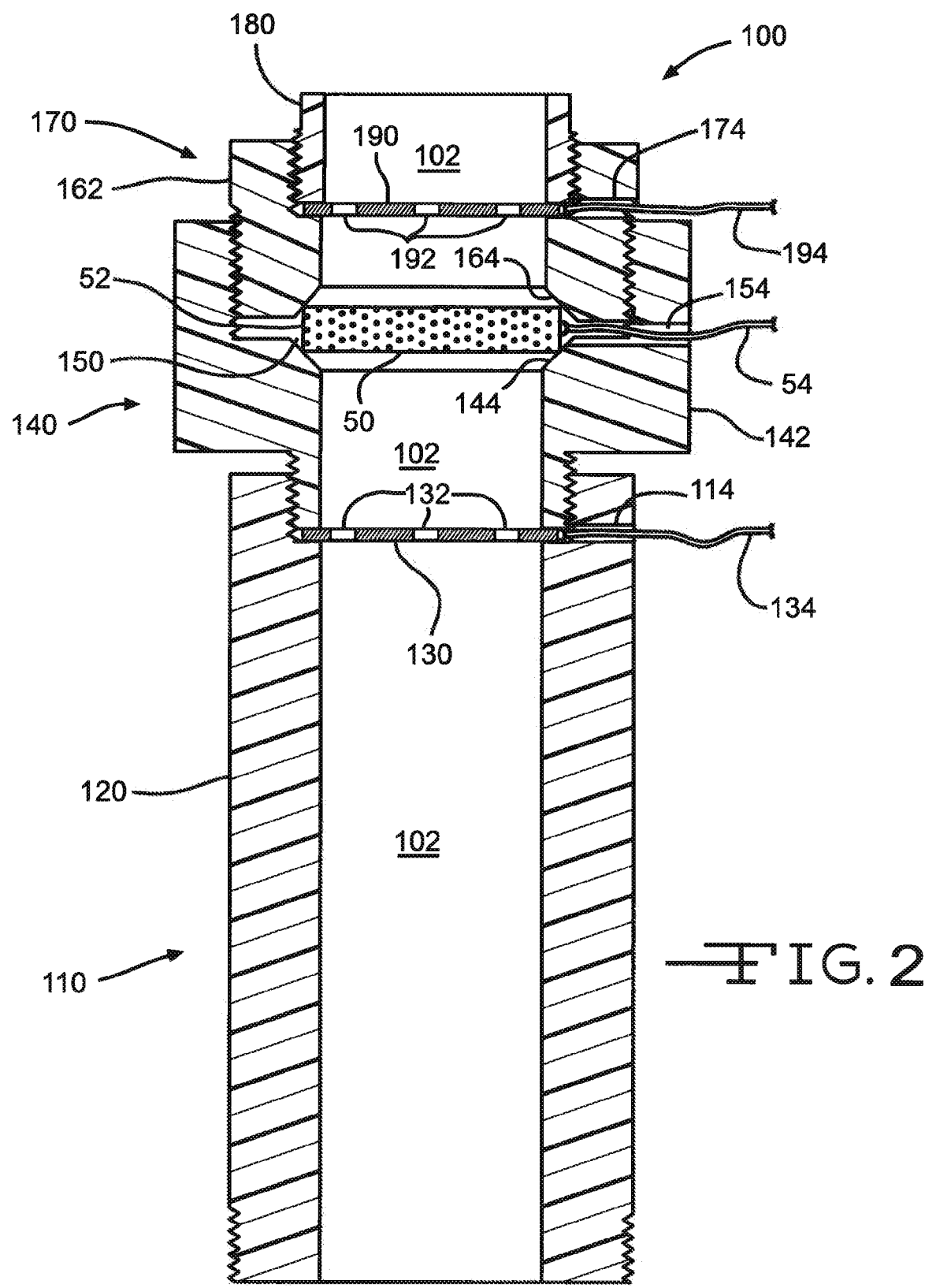
FIG. 2 is a side cross-sectional view of one embodiment of a container comprising the anodizing apparatus shown in FIG. 1.
Figure 3:
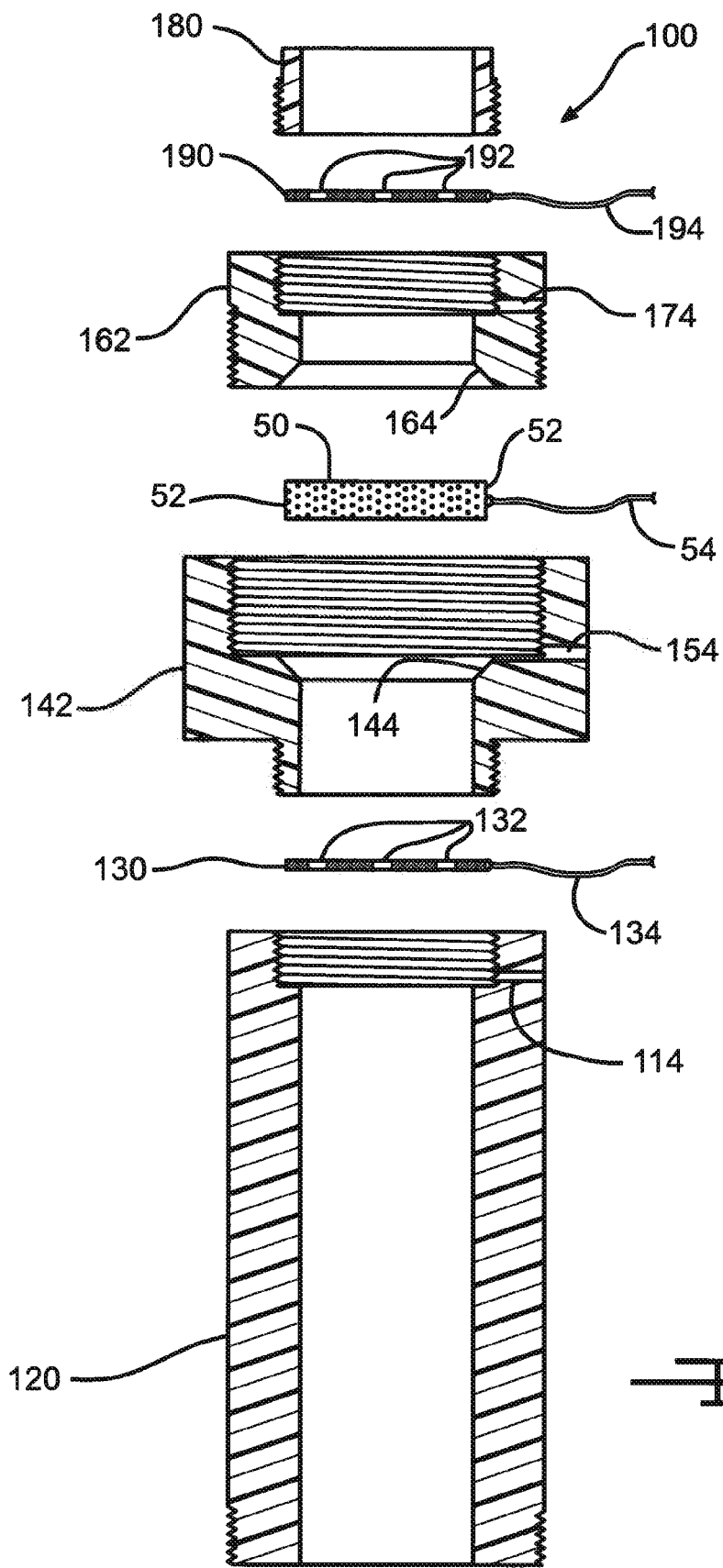
FIG. 3 is an exploded cross-sectional view of the container of FIG. 2.

Referring now to the drawings, FIGS. 1 to 3 show an apparatus 10 comprises an insulative container 100, which functions as an electrolytic cell in the anodization process. During the process, a liquid electrolyte is flowed through container 100 and through a porous valve metal pellet 50 held therein. Apparatus 10 also includes a reservoir 20 for containing the liquid electrolyte, a pump 30 and various liquid conduits for delivering electrolyte from the reservoir 20 through container 100 and back to the reservoir. Apparatus 10 further comprises a power supply 40 for delivering an electrical current through one or more cathodes in the container 100, and through the valve metal pellet 50 therein, which functions as an anode in the circuit.

Container 100 is comprised of an exterior, a lower region 110, a central region 140 including a cavity 150 for holding the porous pellet, and an upper region 170. A continuous passageway 102 within the interior of container 100 extends through the lower region 110, the central region 140 including its cavity 150, and the upper region 170.

A lower screen 130 is disposed in the passageway 102 in the lower container region 110. The lower screen 130 comprises a sheet of electrically conductive material with at least one perforation 132, and preferably many perforations, in order to permit electrolyte flow therethrough. In like manner, an upper screen 190 is disposed in passageway 102 in the upper container region 170. The upper screen 190 also comprises a sheet of electrically conductive material with one or more perforations 192 therethrough. Screens 130, 190 may be made from any suitable electrically conducting material which is perforated to permit the flow of electrolyte. Examples include a valve metal, preferably the same as that of the valve metal pellet 50, carbon, platinum, nickel, or other conductive material that is sufficiently stable under operating conditions. The screen may be made from a continuous sheet with perforations punched, cut, or drilled therethrough, or from a woven wire mesh with the perforations 132, 192 formed by the interstices between the wires. A thin sintered wafer of valve metal material is also suitable.

When liquid electrolyte is delivered into the continuous passageway 102 at the lower region 110, the electrolyte flows through the lower screen 130, the cavity 150 of the central region 140 and the porous pellet 50 held therein, and through the upper screen 190. As described previously, other valve metal forms may be substituted for porous pellet 50.

An example of an effective liquid electrolyte for the anodizing process is disclosed in commonly assigned U.S. Pat. No. 6,231,993 to Stephenson et al, and comprises an aqueous solution of ethylene glycol or polyethylene glycol and $H_3PO_4$. Another exemplary electrolyte is described in U.S. application Ser. No. 11/559,968, filed Nov. 15, 2006, and comprises about 80 volume percent polyethylene glycol (PEG400) with a minor volume percent amount of $H_3PO_4$ and remainder de-ionized water, and has a resistivity of about 1,000 ohm-cm to about 30,000 ohm-cm at 40° C.

The porous pellet 50 to be anodized is preferably formed by sintering a pressed body of valve metal powder. Suitable valve metals and methods for sintering them are disclosed in U.S. Pat. No. 6,695,510 to Liu et al. This patent is assigned to the assignee of the present invention and incorporated herein by reference. The porous pellet 50 is formed as a thin disc, having an outer edge 52 defining a perimeter thereof. The pellet 50 may be cylindrical as shown in FIG. 2, or of an irregular shape determined specifically for use in a particular electrolytic capacitor. Accordingly, the cavity for holding the valve metal body is dimensioned to be contiguous with the perimeter of the porous pellet. An example of such an irregularly shaped porous pellet is shown as pellet 51 in FIG. 5, which is held in a correspondingly shaped cavity formed between a lower housing portion 242 and an upper housing portion 262.

Referring again to FIGS. 2 and 3, the porous pellet 50 may further comprise a lead wire 54 extending therefrom. When the pellet 50 is contained within the container cavity 150, the lead wire 54 extends outside the container 100. The central container region 140 is provided with a port 154 for routing the lead wire 54 from the cavity 150 to the container exterior. In like manner, the lower screen 130 comprises a lower lead 134 extending to the container exterior, and the upper screen 190 comprises an upper lead 194 extending to the container exterior. Ports 114 and 174 are provided in lower and upper sections 110 and 170 for routing the respective lead wires 134 and 194 to the container exterior. If necessary, seals or a small amount of semi-solid sealing material (neither shown) may be provided around the lead wires 54, 134 and 194 or at the screen 130, 190 perimeters to prevent electrolyte from leaking out of the container 100.

The leads 54, 134 and 194 connect the power supply 40 to the respective pellet 50 and cathode screens 130, 190. Referring to FIG. 1, the negative terminal 42 of the power supply 40 is connected to the leads 134, 194 of the screens 130, 190 serving as negative electrodes or cathodes and the positive terminal 44 is connected to the lead wire 54 of the pellet 50 serving as a positive electrode or anode. That way, when electrical power is applied to the screen leads 134, 194 and the pellet lead 54 while a liquid electrolyte flows therethrough, the screens 130, 190 are at a negative polarity with respect to the positive polarity of the pellet 50. This results in the exposed surfaces including the interior porous surfaces of the pellet 50 being anodized with an oxide of the valve metal formed thereupon. In operation, the apparatus 10 functions as an electrolytic cell when anodizing the porous pellet 50. As used in this instance, the term "surface" of the pellet is meant to indicate the entire surface at the solid-liquid interface, including the external (visible) surface as well as the interstitial pore surfaces of the porous pellet 50.

The container may be provided with different configurations for holding the cathode screens and the porous pellet or other valve metal bodies in the flowing electrolyte stream. In one embodiment depicted in FIGS. 2 and 3, the lower container region 110 comprises a lower cathode retainer 120, the upper region 170 comprises an upper cathode retainer 180, and the central region 140 comprises a lower housing portion 142 that is contiguous with an upper housing portion 162. The cavity 150 for holding the porous pellet 50 is formed between the lower housing portion 142 and the upper housing portion 162. Countersinks 144 and 164 are formed in the lower housing portion 142 and the upper housing portion 162, respectively. That way, when the housing portions are assembled, the pellet cavity 150 is formed therebetween.

Lower cathode screen 130 is disposed between the lower cathode retainer 120 and the lower housing portion 142, and the upper cathode screen 190 is disposed between the upper cathode retainer 180 and the upper housing portion 162. The retainers 120, 180 and housing portions 142, 162 are made of an insulating material that prevents an electrical short circuit between the cathode screens 130, 190 and the porous pellet 50 when a voltage is applied to them. One preferred insulative material is polypropylene. Natural polypropylene is preferred because it contains no additives that can leach out and contaminate the electrolyte, and possibly cause impurities and defects to form in the oxide layer. Other polymers or ceramic materials may be suitable. However, the operative requirement is that the material be electrically insulative, resistant to chemical degradation by the electrolyte, non-reactive in the anodization process, and contains no leachates that may contaminate the electrolyte.

In the embodiment depicted in FIGS. 2 and 3, retainers 120, 180 and housing portions 142, 162 are provided with matched threads for fastening them to each other. Seals (not shown) and/or thread sealants may also be used to prevent leakage of the electrolyte from the container. It will be apparent that retainers 120, 180 and housing portions 142, 162 may be secured and sealed to each other by other means known in the fluid handling arts.

Figure 4:
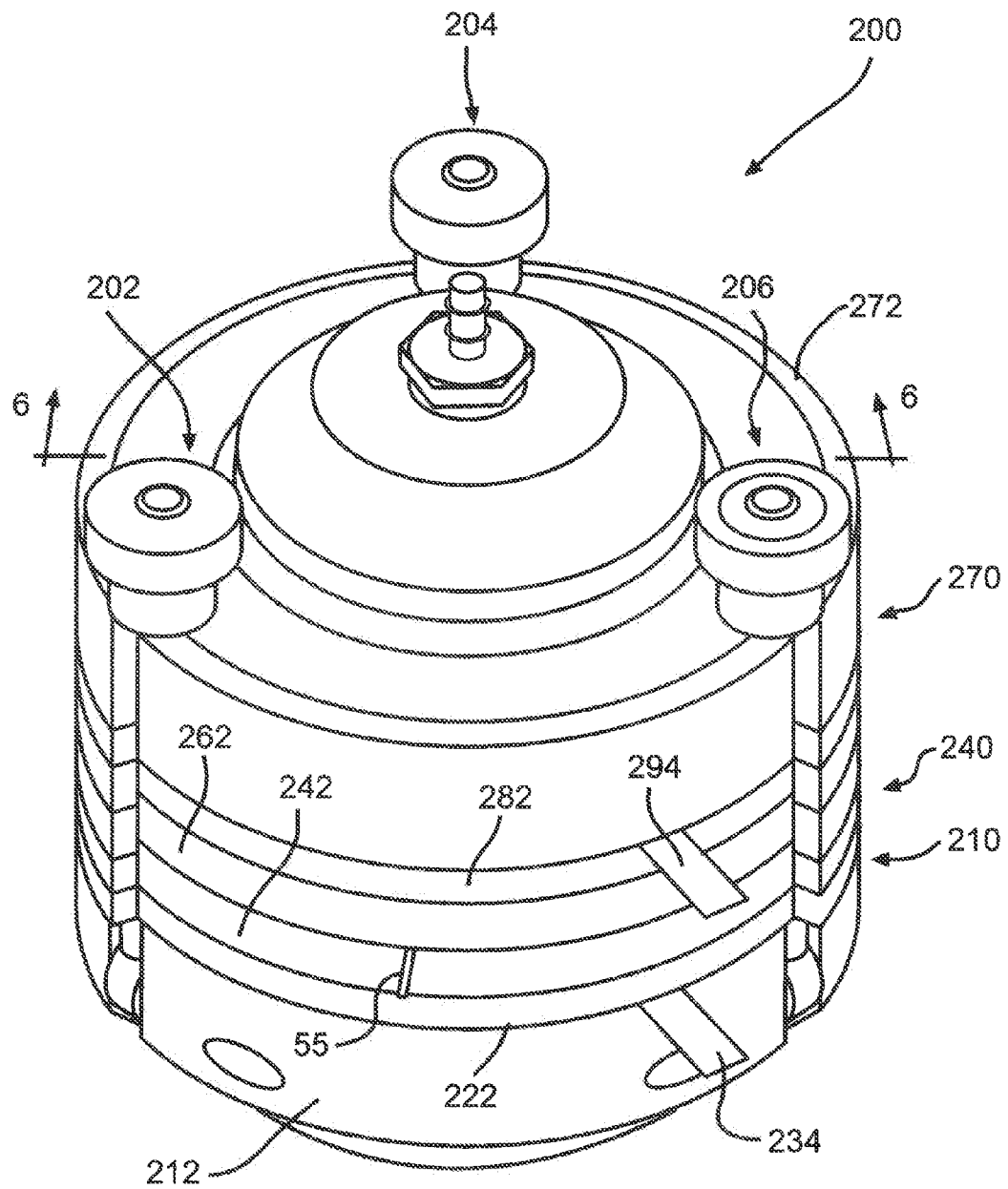
FIG. 4 is a perspective view of another embodiment of a container for anodizing a valve metal pellet immersed in a flowing stream of electrolyte, wherein the valve metal pellet may have an irregular shape.
Figure 5:
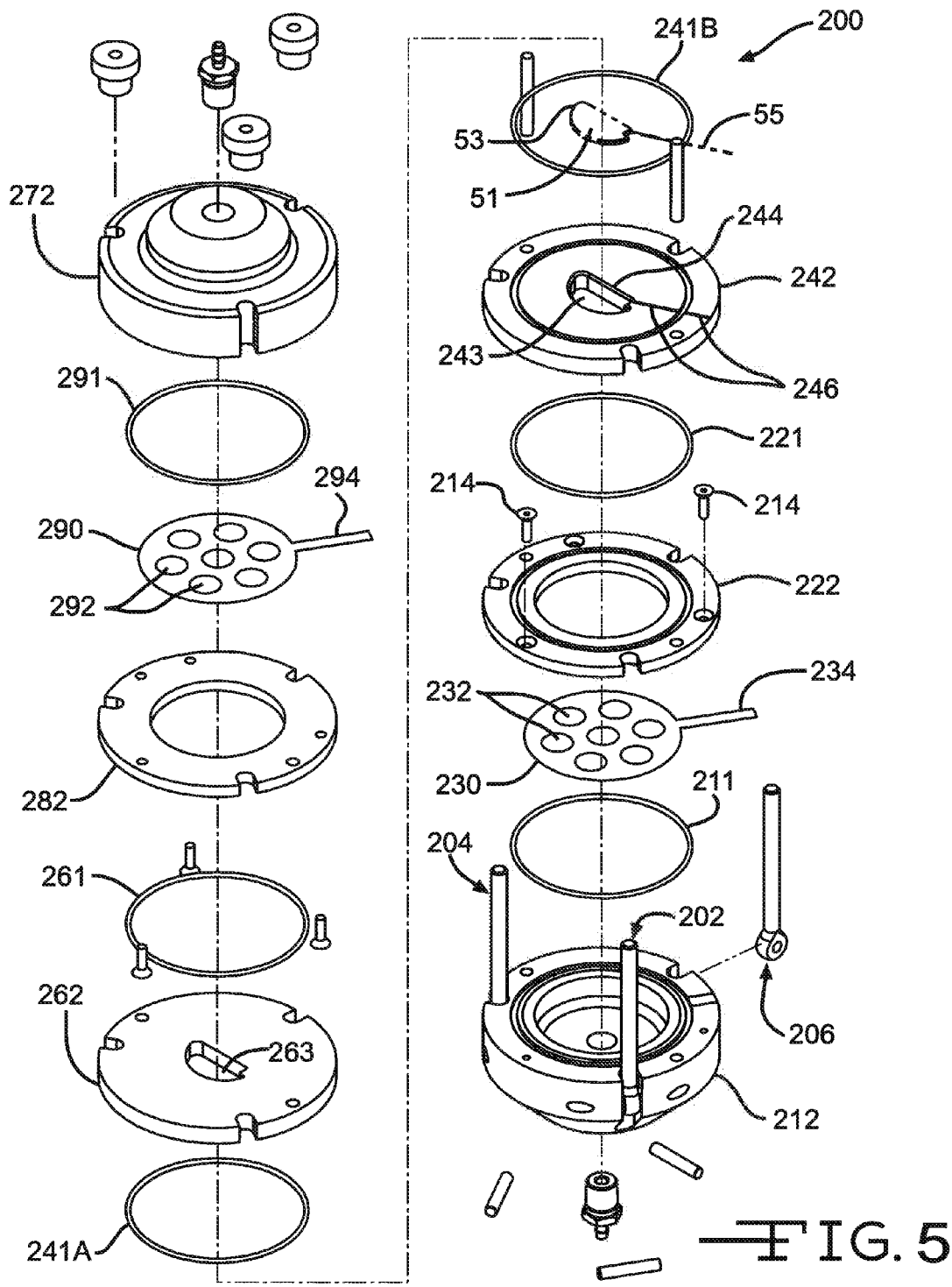
FIG. 5 is an exploded view of the container of FIG. 4.
Figure 6:
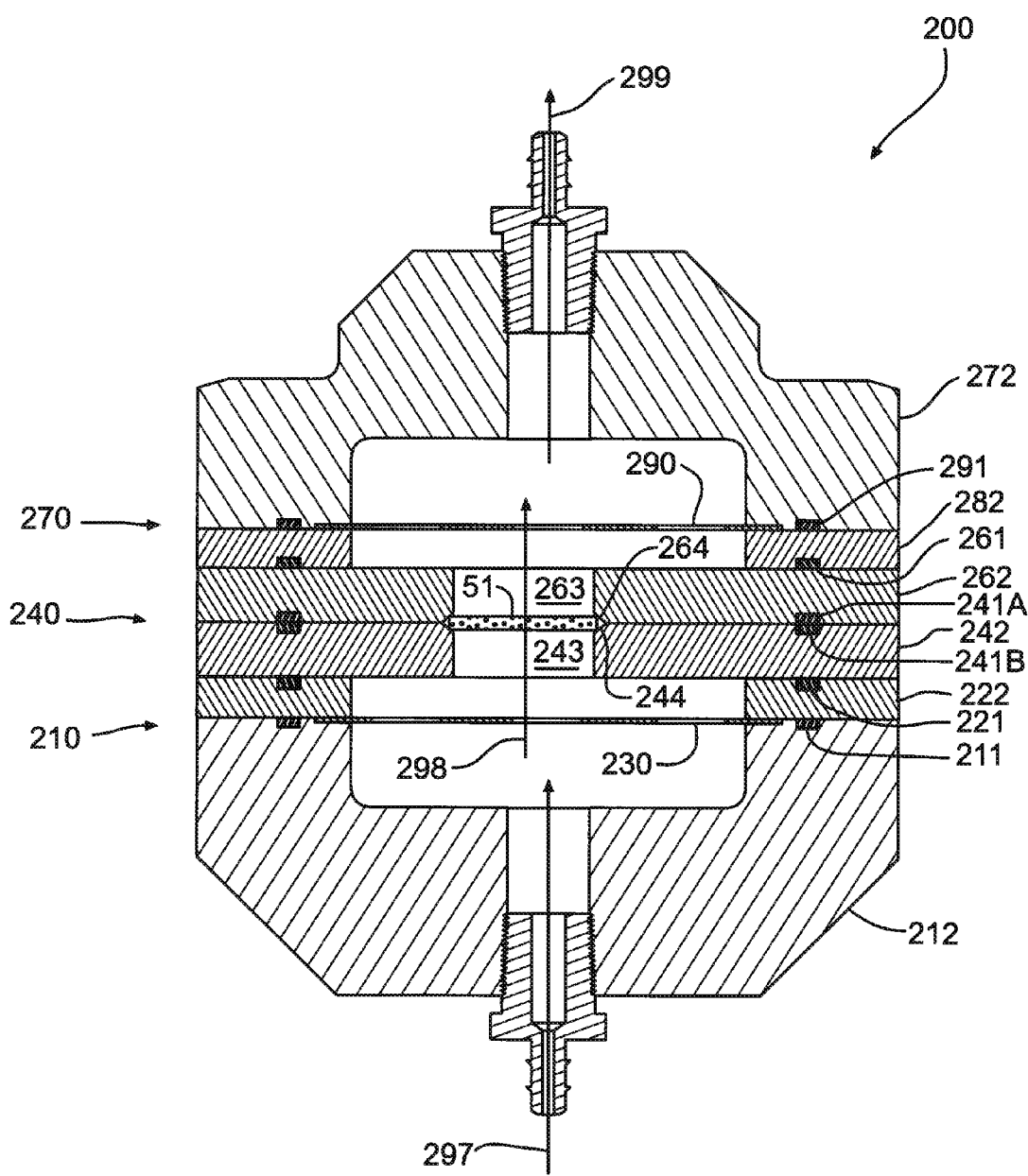
FIG. 6 is a cross-sectional view taken along the line 6-6 of FIG. 4.

Another embodiment of a suitable container for the anodizing process is shown in FIGS. 4 to 6. This container is advantageous in the anodization of irregularly shaped anode pellets. Container 200 is comprised of a lower region 210, a central region 240, and an upper region 270 forming a continuous passageway for liquid electrolyte flow, as indicated by arrows 297, 298 and 299 (FIG. 6).

The lower region 210 comprises a lower retainer housing 212 joined to a lower retainer plate 222 by suitable fastening means such as screws 214 (FIG. 5). A lower cathode screen 230 formed with perforations 232 therethrough is disposed between the lower retainer housing 212 and the lower retainer plate 222. A polymeric O-ring seal 211 is provided therebetween surrounding the cathode screen 230. In a like manner, the upper region 270 comprises an upper retainer plate 282 joined to an upper retainer housing 272. An upper cathode screen 290 with perforations 292 surrounded is disposed therebetween. A polymeric O-ring seal 291 surrounds the cathode screen 290 between the upper retainer housing 272 and the upper retainer plate 282. A polymeric O-ring seal 221 is provided between the lower retainer plate 222 and the lower housing portion 242 and another polymeric O-ring seal 261 is provided between the upper housing portion 262 and the upper retainer plate 282.

The central region 240 of the container 200 comprises a lower housing portion 242 that is contiguous with an upper housing portion 262. The lower housing portion 242 comprises a passageway 243 of a restricted cross-section with respect to the passageway through the lower retainer housing 212 and the lower retainer plate 222 that terminates at an outwardly extending beveled edge 244. Similarly, the upper housing portion 262 comprises a passageway 263 of a restricted cross-section with respect to the passageway through the upper retainer plate 282 and the upper retainer housing 272 that terminates at an outwardly extending beveled edge 264. The restricted cross-sections provide for increased fluid flow through this area for more effective movement of the electrolyte over and through the porous valve metal pellet.

The cavity for holding porous pellet 51 is formed between the lower housing portion 242 and the upper housing portion 262 where the beveled edges 244 and 264 meet. During anodization, the porous pellet 51 is held within this cavity surrounded by the sealed contact of its perimeter edge 53 with the beveled edges 244, 264. Polymeric O-ring seals 241A and 2418 are contiguous with each other and surround the pellet 51 between the lower and upper housing portions 242, 262. The porous pellet 51 is formed with a typical crescent shape used in electrolytic capacitors.

Porous pellet 51 further comprises a lead wire 55 extending therefrom. When the pellet 51 is confined within the container cavity where the passageways 243, 263 meet, the lead wire 55 extends between the seals 241A, 2418 to the exterior thereof. This is because the lower housing portion 242 is provided with a channel groove 246 (FIG. 5) and upper housing portion 262 is provided with a corresponding channel (not shown) that together form a port for routing the lead wire 55 from the cavity to the exterior of the container 200.

The lower cathode screen 230 further comprises a lead 234, preferably formed as a tab, extending to the exterior of the container 200. Similarly, the upper cathode screen 290 comprises a lead 294 extending to the container exterior. During the anodization process, leads 55, 234 and 294 are connected to the power supply 40 (FIG. 1) as previously described for container 100 of FIGS. 2 and 3.

The lower region 110, central region 140, and upper region 170 of container 200 are held together during anodization by tie rod assemblies 202, 204 and 206. It will be apparent that other fastening means would be suitable for holding the container components.

The container 200 may further include a first filter mesh (not shown) disposed in the continuous passageway between the lower cathode screen 230 and the cavity for holding the porous pellet 51. A second filter mesh (not shown) is disposed in the continuous passageway between the upper cathode screen 290 and the cavity. The filter meshes prevent solid particulate impurities from being entrained in the flowing electrolyte. Such solid impurities could adversely affect the dielectric oxide layer by forming defects that could cause current leakage or oxide breakdown.

The configuration of container 200 is advantageous in the manufacture of capacitor anode pellets for several reasons. Container 200 is configured for manufacturing of anode pellets of a variety of shapes with minimal tooling costs. Anode pellets of various shapes and sizes can be anodized by changing out only the lower and upper housing portions 242, 262 of the central region 240 with the desired cavity to match the particular anode pellet shape. No other special components are required. Using the tie rod assemblies 202 to 206, container 200 is easily assembled with a porous pellet held therein, and disassembled to remove the anodized pellet after processing. Lower region 210 and upper region 270 are maintained as unitary subassemblies that do not need to be dismantled during pellet changeover. The various components of container 200 are made of suitable insulative materials, as described previously for container 100 of FIGS. 2 and 3.

The containers 100 and 200 of FIGS. 2, 3 and 4 to 6 may be assembled and operated with only a single cathode screen therein. The cathode screen may be located either in the lower region or the upper region of the container. However, the single cathode configuration is not preferred. This is because superior oxide films are formed on the valve metal body when cathode screens are located both upstream and downstream of the valve metal body during anodizing. It is believed that during the anodization of a sintered tantalum pellet, the use of two cathode screens produces a more uniform current distribution in the interstitial space inside the pellets 50, 51.

The containers 100 and 200, and the apparatus 10 of the present invention are particularly useful for anodizing large and high voltage sintered powder anode pellet, such as those used in tantalum electrolytic capacitors. A method to anodize a porous pellet includes the steps of securing the pellet in a cavity within a container 100 or 200, causing a liquid electrolyte to flow through the passageway within the container, through at least one cathode screen, and over and through the porous pellet, connecting the at least one cathode screen and the porous pellet to an opposite polarity terminal of the electrical power supply, thereby causing an electrical current to flow through the liquid electrolyte between the cathode screen and the anode pellet, and forming an oxide layer on the surface of the porous pellet.

For the sake of manufacturability and efficiency, however, it is desirable to reduce the size and cost of the formation equipment. This may be accomplished in a variety of ways, for example, several cavities may be used for simultaneous formation of multiple pellets, in which the several cavities may be fed from a common reservoir of liquid electrolyte. The cavities are preferably arranged in parallel with respect to the liquid flow so that each cavity receives fresh electrolyte from the common reservoir. The cavities may be in individual containers or set into a common plate. Thus, a single pump may be used to supply electrolyte to several forming valve metal pellets, or each cavity may be supplied by its own pump. A similar principle applies to the electrical power supply. Each set of anode and cathode screens may have its own power supply, or a single power supply may be used to provide power to several formations. Different protocols for the application of electrical power to the cathode screens and anode pellet may be used during anodization. Electrical current may be delivered through the electrodes continuously, or intermittently, with the current being maintained constant, or the current being varied. Various anodization protocols are described in the aforementioned U.S. Patent. Application Pub. Nos. 2006/0196774 to Liu et al. and 2006/0191796 to Muffoletto et al.

EXAMPLE I

Tantalum anode pellets were prepared according to the present invention as follows. Cylindrical pellets were obtained from the Tantalum Pellet Company. They were sintered at 1,630° C. for 20 minutes and had nominal dimensions of 0.07 inches thick and 1.02 inches in diameter, and weighed about 6.7 grams. Each pellet was placed in a container of the present invention, and an electrolyte was delivered through the pellet. The electrolyte consisted of 77% polyethylene glycol (PEG400), 7.5% phosphoric acid, and 15.5% water at 40° C., by vol. Two pellets were formed by application of electrical power to the cathode and pellet leads according to the schedule in Table 1.

TABLE 1

| Current (milliamps) | Ending Voltage (V) | Hours Held at Voltage | Hours Off |
|---|---|---|---|
| 134 | 150 | 1 | 1 |
| 87 | 190 | 0 | 1 |
| 67 | 225 | 1 | 1 |
| 40 | 255 | 0 | 1 |
| 40 | 280 | 1 | 1 |
| 20 | 310 | 0 | 1 |
| 20 | 330 | 1 | 1 |
| 20 | 355 | 1 | 1 |
| 20 | 375 | 1 | 1 |
| 20 | 390 | 1 | 1 |
| 20 | 410 | 1 | 1 |
| 20 | 430 | 1 | 1 |
| 20 | 445 | 1 | 0 |
| 20 | 445 | 1 | 0 |

After formation, the pellets were rinsed for 6 hours, dried, and then heat treated in air at 420° C. for 30 minutes before reformation. The reformation step consisted of holding the pellet at 445 volts for one hour in the formation electrolyte.

After reformation, the DC current leakage (DCL) of the pellets was measured. The value was obtained after holding for 5 minutes at 415 volts in the formation electrolyte at 40° C. The values for DCL obtained were 39 and 40 microamperes. It is common practice to express the leakage in units of nanoamps/($\mu F \cdot V_w$) where $\mu F$ is the capacitance in microfarad at 120 Hz and $V_w$ is the working voltage, in this case 415 volts. Values of about 1.0 nA/(μF·$V_w$) were obtained for these pellets, which is a satisfactory value.

EXAMPLE II

Another pellet was formed and tested in the same manner as described in Example I except that the formation protocol in Table 1 was changed. The "hours held at voltage" in column 3 of Table 1 was reduced to 0.1 hours. The DC leakage was essentially identical to the values obtained for the other pellets; however, the formation time was reduced by about 12 hours. This demonstrates the advantage of the present invention in making suitable capacitor anode pellets at a significantly higher throughput.

EXAMPLE III

For a further comparison of formation time and properties of valve metal pellets made according to the conventional procedure and according to the method described herein, 20 identical "D" shape pellets obtained from Tantalum Pellet Company were formed to 420 volts. The pellets each had a weight of about 8.2 grams and a green thickness of 0.072 inches. They were sintered at 1,650° C. for 20 minutes. Ten of the pellets were formed using a conventional tank formation procedure according to the protocol shown in Table 2.

TABLE 2

| Current (mA) | Voltage (V) | Hold Time (hours) | Off Time (Hours) |
| --- | --- | --- | --- |
| 108.9 | 75 | 0 | 1 |
| 54.4 | 150 | 0 | 1 |
| 43.0 | 190 | 0 | 1 |
| 36.3 | 225 | 0 | 1 |
| 32.0 | 255 | 0 | 1 |
| 29.2 | 280 | 0 | 1 |
| 26.3 | 310 | 0 | 1 |
| 24.7 | 330 | 0 | 1 |
| 23.0 | 355 | 0 | 1 |
| 21.8 | 275 | 0 | 1 |
| 20.9 | 390 | 0 | 1 |
| 19.9 | 410 | 0 | 1 |
| 19.4 | 420 | 1 | 0 |

The other ten pellets were formed in containers of the present invention. Two containers were used simultaneously with a common electrolyte reservoir. A separate power supply and pump was used for each container. The flow rate to each pellet was controlled to about 300 millimeters/minute by means of individual peristaltic pumps. These pellets were formed according to the protocol in Table 3.

TABLE 3

| Current (mA) | Voltage (V) | Hold Time (hours) | Off Time (Hours) |
| --- | --- | --- | --- |
| 163 | 150 | 0 | 0.1 |
| 129 | 190 | 0 | 0.1 |
| 109 | 225 | 0 | 0.1 |
| 94 | 260 | 0 | 0.1 |
| 83 | 296 | 0 | 0.1 |
| 74 | 330 | 0 | 0.1 |
| 56 | 365 | 0 | 0.1 |
| 41 | 400 | 0 | 0.1 |
| 29 | 420 | 2 | 0.1 |

The median formation times for the two sets of pellets were 62 hours using the conventional procedure and 25 hours using the apparatus of the present invention. Median nA/uF·V values were 0.64 and 0.67. The greatly reduced formation time for the pellets of the present invention was made possible by the higher current densities used, which provided improved electrolyte flow and electrolyte cooling in the pellets' interstitial pore space.

Thus, it should be apparent to those skilled in the art that the claimed apparatus and method offers the following advantages over the prior art: 1) increased heat and mass transfer in the electrolyte within the interior of the pellet throughout the course of anodizing, thereby avoiding excessive temperature and accumulation of spent electrolyte at the valve metal structure; 2) a relatively short anodizing time; and 3) simplified anodizing electronics and equipment resulting in a low cost anodization protocol. The claimed anodization protocol also results in improved anode electrical properties including lower DC leakage, more stable shelf life, improved charge/discharge energy efficiency, and improved stability during operation life. These properties are strongly desired for critical applications such as for the anode of a capacitor powering an implantable cardioverter defibrillator.

It is, therefore, apparent that there has been provided, in accordance with the present invention, a method and apparatus for anodizing a valve metal body in a flowing liquid electrolyte. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A system for anodizing a valve metal body in a liquid electrolyte, the system comprising:
   a) a valve metal body as a porous structure capable of having an electrolyte flow therethrough and comprising a lower external surface and an upper external surface, the lower and upper external surfaces being spaced apart from each other by an intermediate perimeter;
   b) a container having an exterior providing a continuous passageway extending along and through a lower container region having a lower electrode, a central container region including at least one cavity for holding the valve metal body, and an upper container region having an upper electrode, wherein the central container region is dimensioned to contact the perimeter of the valve metal body held in the cavity in a substantially sealed relationship; and
   c) wherein the liquid electrolyte is flowable past the lower electrode and into the valve metal body by flowing through the lower exterior surface and out the upper exterior surface and then past the upper electrode while the valve metal body is maintained at an opposite polarity with respect to the lower electrode to thereby form a dielectric oxide on the valve metal body.

2. The system of claim 1 wherein the lower electrode is at a negative polarity serving as a cathode and the valve metal body is at a positive polarity serving as an anode.

3. The system of claim 1 wherein the container further comprises an upper container region having an upper electrode disposed in the passageway therein, the upper electrode being maintained at the same polarity as the lower electrode.

4. The system of claim 1 wherein the lower electrode is a perforated screen that allows the electrolyte to flow therethrough.

5. The system of claim 1 wherein the valve metal body further comprises a lead wire and the central container region comprises a port for routing the lead wire from the cavity to the container exterior.

6. The system of claim 1 wherein the lower electrode comprises a lead extending to the container exterior.

7. The system of claim 1 further comprising a power supply having a first terminal electrically connected to the lower electrode and a second, opposite polarity terminal electrically connected to the valve metal body.

8. The system of claim 1 wherein the lower electrode is selected from the group consisting of carbon, platinum, nickel, tantalum, niobium, aluminum, titanium, and alloys thereof.

9. The system of claim 1 wherein the lower electrode is a screen of a valve metal that is either the same or different as that of the valve metal body.

10. The system of claim 3 wherein the lower container region comprises a lower electrode retainer, the upper container region comprises an upper electrode retainer, the central container region comprises a lower housing portion that is contiguous with an upper housing portion, and the cavity for holding the valve metal body is formed between the lower housing portion and the upper housing portion.

11. The system of claim 10 wherein the lower electrode is a lower screen disposed between the lower electrode retainer and the lower housing portion, and the upper electrode is an upper screen disposed between the upper electrode retainer and the upper housing portion.

12. The system of claim 1 wherein the container is of an electrically insulative material.

13. The system of claim 3 wherein the lower container region comprises a lower retainer housing joined to a lower retainer plate, the upper container region comprises an upper retainer housing joined to an upper retainer plate, the central container region comprises a lower housing portion that is contiguous with an upper housing portion, and the cavity for holding the valve metal body is between the lower housing portion and the upper housing portion.

14. The system of claim 13 wherein the lower electrode is an electrically conductive screen, disposed between the lower retainer housing and the lower retainer plate, and the upper electrode is an electrically conductive screen disposed between the upper retainer housing and the upper retainer plate.

15. The system of claim 1 further comprising at least one filter disposed in the continuous passageway to entrain impurities in the electrolyte.

16. The system of claim 1 wherein the container has two or more cavities arranged in parallel and fed with fresh electrolyte from a common electrolyte reservoir, each cavity holding a valve metal body.

17. The system of claim 1 wherein the two or more cavities are set into a common plate.

18. The system of claim 17 wherein the valve metal bodies held in the two or more cavities are each at a positive polarity serving as an anode with respect to at least one negative polarity electrode serving as a cathode and connected to a common power supply.

19. The system of claim 17 wherein the valve metal bodies held in the two or more cavities are each at a positive polarity serving as an anode with respect to at least one negative polarity electrode serving as a cathode and connected to a power supply dedicated to each valve metal body.

20. A system for anodizing a valve metal body in a liquid electrolyte, the system apparatus comprising:
   a) at least a first and a second valve metal bodies, each valve metal body being a porous structure capable of having an electrolyte flow therethrough and comprising a lower external surface and an upper external surface, the lower and upper external surfaces being spaced apart from each other by an intermediate perimeter;
   a container of an electrically insulative material having an exterior providing a continuous passageway extending along and through a lower container region having a lower electrode, a first central container region including a first cavity for holding the first valve metal body, and an upper container region having an upper electrode;
   wherein the first central container region is detachable from the lower and upper container regions and replaceable by a second central container region having a second cavity for holding the second valve metal body that is shaped differently than the first valve metal body, and wherein the first and second central container regions are dimensioned to contact the respective first and second perimeters of the first and second valve metal bodies in a substantially sealed relationship; and
   d) wherein the liquid electrolyte is flowable past the lower container region including the lower electrode, into the first or second central container regions including the first or second cavities holding the respective first or second valve metal bodies such that the electrolyte flows through the lower surface of the valve metal body and out the upper surface thereof and then into the upper container region including the upper electrode with the upper and lower electrodes being maintained at an opposite polarity as the first or the second valve metal body.

21. The system of claim 20 wherein the upper and lower electrodes are perforated screens that allow the electrolyte to flow therethrough.

22. The system of claim 20 wherein the first and second valve metal bodies comprise first and second leads connectable to a first terminal of a power supply and the lower and upper electrodes comprise respective leads electrically connectable to an opposite polarity of the power supply.

23. The system of claim 20 wherein the lower and upper electrodes are screens of a valve metal selected from the group consisting of tantalum, niobium, aluminum, titanium, and alloys thereof that is the same as that of the first, or the second valve metal body.

24. A system for anodizing a tantalum body in a liquid electrolyte, the system comprising:
   a) a tantalum body as a porous structure capable of having an electrolyte flow therethrough and comprising a first external surface and a spaced apart second external surface, the first and second external surfaces of the tantalum body being spaced apart from each other by an intermediate perimeter;
   b) a container having an exterior providing a continuous passageway extending along and through a first container region having a first electrode and a central container region including at least one cavity for holding the tantalum body, and a second container region having a second electrode, wherein the central container region is dimensioned to contact the perimeter of the tantalum body held in the cavity in a substantially sealed relationship; and
   c) wherein the liquid electrolyte is flowable past the first electrode and into the tantalum body by flowing through the first exterior surface and out the second exterior surface and then past the second electrode while the tantalum body is maintained at an opposite polarity with respect to the first electrode to thereby form a dielectric oxide on the tantalum body.

* * * * *

UNITED STATES PATENT AND TRADEMARK OFFICE
CERTIFICATE OF CORRECTION

PATENT NO.        : 8,313,621 B2                                    Page 1 of 1
APPLICATION NO.   : 13/015679
DATED             : November 20, 2012
INVENTOR(S)       : Goad et al.

It is certified that error appears in the above-identified patent and that said Letters Patent is hereby corrected as shown below:

In the Claims:

Column 13, line 62 delete "apparatus"

Signed and Sealed this
Twenty-sixth Day of November, 2013

Margaret A. Focarino
*Commissioner for Patents of the United States Patent and Trademark Office*